May 14, 1963 — H. C. LUDWIG — 3,089,949
ARC WELDING METHOD AND ARTICLE
Filed Nov. 28, 1958 — 3 Sheets-Sheet 1

WITNESSES:
Bernard R. Gieguey
James F. Young

INVENTOR
Howard C. Ludwig
BY
Wymen Diamond.
ATTORNEY

United States Patent Office 3,089,949
Patented May 14, 1963

3,089,949
ARC WELDING METHOD AND ARTICLE
Howard C. Ludwig, Pittsburgh, Pa., assignor to Westinghouse Electric Corporation, East Pittsburgh, Pa., a corporation of Pennsylvania
Filed Nov. 28, 1958, Ser. No. 776,986
7 Claims. (Cl. 219—118)

This application is a continuation-in-part of application Serial No. 637,179, filed January 30, 1957, now abandoned.

This invention relates to arc welding and has particular relation to the arc welding of zirconium-base alloys and is also applicable to the welding of zirconium.

Zirconium-base alloys are composed of zirconium with small quantities of other materials such as tin, nickel, iron and chromium. A typical zirconium-base alloy is called Zircaloy-2 and its normal composition is:

| | Percent |
|---|---|
| Tin | 1.45 |
| Iron | .135 |
| Nickel | .055 |
| Chromium | .1 | and the remainder essentially zirconium. Another alloy Zircaloy-3 has the following composition:

| | Percent |
|---|---|
| Tin | .25 |
| Iron | .25 | and the remainder essentially zirconium. Zirconium alloys such as Zircaloy-2 and Zircaloy-3 are made by arc melting with a consumable electrode of zirconium sponge which is in turn prepared by the Kroll process described on pages 225 through 235 of "The Metallurgy of Zirconium," by B. Lustman and F. Kertze, Jr., National Nuclear Energy Series, Division VII4, McGraw-Hill Book Company, Inc., 1955. The arc melting may take place in a vacuum as described on pages 225 through 230 of the above text or in an inert gas atmosphere described on pages 230 through 235 of the same text. The alloy components are added during the arc melting.

Joints are usually produced between parts of zirconium-base alloys by arc welding with a tungsten or thoriated tungsten electrode in a shield of highly pure helium at straight polarity. It has been found that the penetration of the weld into a joint between parts of the vacuum-melted zirconium-base alloy is substantially less than the penetration in the case of inert-gas-melted alloy. In joints between parts of the vacuum-melted zirconium-base alloy, and some times in the case of inert-gas-melted alloy, the penetration is inadequate. Attempts have been made to cure this deficiency by increasing the welding current substantially, but such attempts have not been appreciably successful because the higher currents demand a consumable electrode of correspondingly higher cross-sectional dimensions and this in turn results in a reduction in the penetration at the new current.

It is accordingly broadly an object of this invention to increase the penetration of the weld in the joining of zirconium-base alloy parts by arc welding.

A more general object of this invention is to increase the penetration of the weld in the joining of parts consisting predominantly or wholly of zirconium by arc-welding.

This invention, in its broader aspects, arises from the discovery that the higher penetration in the welding of inert-gas-melted zirconium-base alloys is caused by the heat developed in a workpiece of this alloy during arc welding. The increased heat results from the diffusion, during the welding, of occluded gases which the inert-gas-melted zirconium-base alloy retains and in particular, by the diffusion of chlorine retained by this inert-gas-melted alloy. It has been found that during the welding process, this chlorine diffusing to the surface of the pool interacts electronically with the arc to increase the heat developed at the pool, thus increasing the penetration. A similar interaction can be produced by other halogens such as iodine and by compounds of halogens such as chlorine and fluorine which appear to dissociate in the heat of the arc.

In accordance with this invention the penetration in the arc welding of vacuum-melted zirconium-base alloys as well as inert-gas-melted zirconium-base alloys is increased by introducing small quantities of halogen gases or halogen containing gases into the atmosphere in which the welding is being carried out. The percent by volume of the added gas should be so small that there is no reaction with the weld metal or with the material being welded. In the case of vacuum-melted alloy the penetration of the weld may be increased by introducing sufficient inert-gas-melted zirconium sponge (or alloy) into the vacuum-melted alloy to achieve the desired penetration. This introduction may be effected by providing a workpiece of vacuum-melted zirconium-base alloys having adequate inert-gas-melted zirconium on the part of its surface which is to constitute the pool of the weld to attain the desired penetration and it is a specific object of this invention to provide such a workpiece.

In accordance with the latter aspects of this invention, a workpiece of vacuum-melted zirconium-base alloy is provided which has on its surface sufficient inert-gas-melted zirconium sponge or alloy to achieve the desired penetration. The inert-gas-melted sponge may be deposited on the surface in the form of a powder or a painted on coating or an inert-gas-melted zirconium foil may be secured to the surface of the vacuum-melted alloy.

While the article in accordance with this invention facilitates the arc welding of the vacuum-melted zirconium-base alloy, the inert-gas-melted zirconium may be added to a pure vacuum-melted article during the welding operation as, for example, by projecting a powder of the inert-gas-melted sponge on the workpiece during the welding operation or by causing such a powder to flow onto the workpiece through the shielding inert-gas stream.

The penetration both in the case of vacuum-melted alloy and inert-gas-melted alloy may also be increased by adding chlorine or iodine directly or by adding gaseous compounds such as the chlorofluoro derivatives of ethane and methane, for example Freon 11 ($CCl_3F$), Freon 12 ($CCl_2F_2$), Freon 114 ($CClF_2$) or by adding sulphur hexafluoride ($SF_6$). The welding is usually carried out in an inert-gas atmosphere and effective penetration can be achieved in the case of chlorine and the Freons by adding up to about 1% by volume. In the case of sulphur hexafluoride the penetration is improved by adding about 1% by volume of the hexafluoride but to obtain .09 inch in the specimen of .160 inch thickness. This invention arises from a study which was made of the inert-gas and vacuum-melted alloys and of the arc phenomenon encountered in welding them to determine the cause of the difference in penetration.

Chemical analysis of the two alloys revealed substantial differences between them. Typical results of such analyses of samples of an inert-gas-melted specimen 5Y679 and a vacuum-melted specimen FZ99 of Zircaloy-2 are shown in Table I.

TABLE I

*Chemical Composition (Parts per Million) of Representative Zirc-aloy-2 Materials*

| Ingot No. | Sponge blend | N | C | Cl | H | O | Al | Co | Cu | Hf | Mg | Mn | Mo | Pb | Si | Ti | V | W | B | Cd |
|---|---|---|---|---|---|---|---|---|---|---|---|---|---|---|---|---|---|---|---|---|
| 5Y679 | Q-63 | 39 | 55 | 32 | 58.6 | 1,400 | 37 | <10 | 5 | <100 | 1 | 30 | <10 | 9 | 9 | <20 | <10 | <50 | <0.2 | <0.2 |
| FZ99 | Q-64 | 37 | 90 | 6 | 18 | 1,500 | 44 | <10 | 17 | 55 | 4 | 21 | <10 | <10 | <50 | <20 | | <50 | | | penetration equivalent to that obtained with chlorine and the Freons the concentration of the hexafluoride should be substantially higher.

The novel features considered characteristic are disclosed generally above. The invention itself, both as to its organization and its method of operation together with additional objects and advantages thereof will be understood from the following description of a specific embodiment when read in connection with the accompanying drawings, in which.

Figure 1:
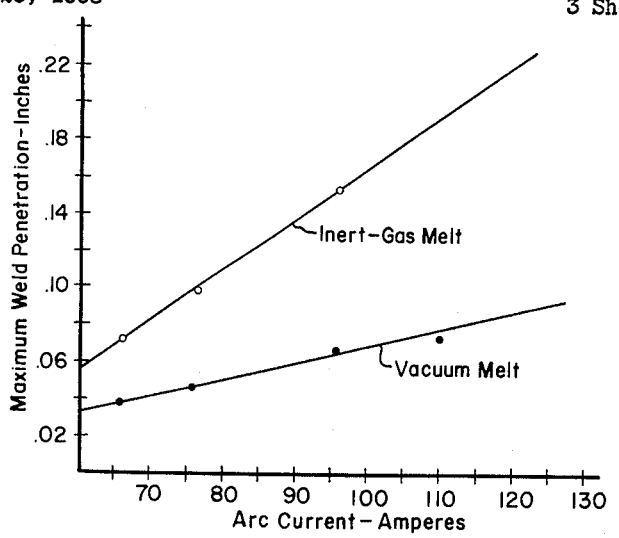
FIGURE 1 is a graph showing the relationship between the penetrations in workpieces of inert-gas-melted zirconium-base alloy and a vacuum-melted zirconium-base alloy.

FIG. 1 was produced by making weld deposits on a plurality of specimens composed respectively of inert-gas-melted Zircaloy-2 and vacuum-melted Zircaloy-2 with electrodes of the same composition respectively. In each case, the arc was produced between a non-consumable electrode as a cathode and a specimen as an anode in a shield of highly purified helium and in each case, the penetration was measured.

In FIG. 1 this data is presented graphically with weld penetration in inches plotted vertically and the arc current in amperes plotted horizontally. The Zircaloy specimens are identified as 5Y506 and Z32, the former being inert-gas-melted and the latter vacuum-melted. It is seen that the penetration for the inert-gas-melted alloy is substantially higher than for the vacuum-melted alloy. FIG. 1 also shows that increase in the arc current for the vacuum-melted alloy does not materially improve the penetration. An increase in the current from 65 amperes to 125 amperes increases the penetration only from about .038 to This table does not list the tin, nickel, iron and chromium which are present in the quantities mentioned above. The left-hand column in the table lists the specimens, the next column the zirconium sponge blends which serve as non-consumable electrodes in preparing the specimens and the other columns the chemical components and their amounts.

From Table I it appears that the vacuum-melted and inert-gas-melted specimens differ principally in their content of chlorine and hydrogen; the vacuum-melted alloy having substantially less chlorine and hydrogen content than the inert-gas-melted. Additional studies indicate that in zirconium sponge prepared by the Kroll process, the chlorine may be as high as 100 parts per million or more.

Figure 2:
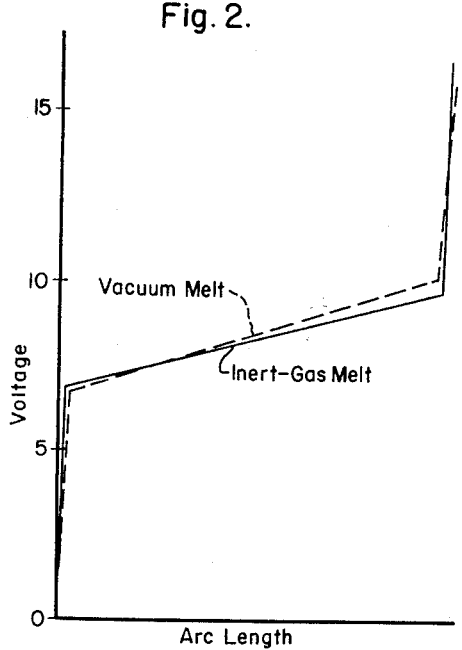
FIG. 2 is a graph showing the characteristics of the arcs in welding with the alloys of the two types.

FIG. 2 is a graph showing the voltage distribution in typical welding arcs produced in welding the two alloys investigated in arriving at this invention. In this arc, voltage with respect to the cathode or welding electrode is plotted vertically and arc-length horizontally. This curve shows that for both alloys, the voltage ($V_{c_{IGM}}$ and $V_{c_{VM}}$) at the electrode rises sharply to substantially the same magnitude for both alloys. From the point at which the voltage at the cathode or electrode reaches its maximum magnitude to a point near the workpiece or anode, the voltage rises at a lower rate, the voltage for the vacuum-melted alloy rising at a slightly higher rate than the voltage for the gas-melted alloy. Near the anode the voltage ($V_{a_{IGM}}$ and $V_{a_{VM}}$) rises sharply, the voltage $V_{a_{IGM}}$ for the gas-melted alloy rising to a higher magnitude than the voltage $V_{a_{VM}}$ for the vacuum-melted alloy. FIG. 2 shows that there are substantially three defined regions in the arc, an anode or workpiece region, a cathode or electrode region, and an intermediate region.

In making the study which led up to this invention, both vacuum and gas-melted Zircaloy-2 workpieces were melted by an arc between these workpieces and a non-consumable electrode and the heat developed in the workpiece and electrode regions was measured by measuring the extent to which water from a constant temperature bath flowing at a predetermined rate in the vicinity of the work and the electrode was heated. During these measurements the electrode remained fixed relative to the workpiece. The results of the measurements are presented in Table II for specimens of vacuum-melted alloy FZ99 and inert-gas-melted alloy 5Y679 and a welding electrode 5Y309 serving as anode (Test No. 8).

TABLE II

*Workpiece and Electrode Heat Output*

Anode material—Zircaloy-2
Cathode pure W electrode (.060 diameter)
FZ99 vacuum melt
5Y679⎫
5Y309⎭ Inert gas melt

| Test No. | Ident. No. | Arc Length, inches | Arc Voltage, volts | Arc Current, amps. | Input to arc power, watts | Water flow rate, ml./sec. Electrode | Water flow rate, ml./sec. Workpiece | Temperature of water rise, °C. Electrode | Temperature of water rise, °C. Workpiece | Heat output, cal./sec. Electrode | Heat output, cal./sec. Workpiece | Heat output, watts Electrode | Heat output, watts Workpiece | Heat output, watts/amp. Electrode | Heat output, watts/amp. Workpiece |
|---|---|---|---|---|---|---|---|---|---|---|---|---|---|---|---|
| 1 | FZ99 | .025 | 14.8 | 60 | 888 | 4.48 | 10.65 | 8.0 | 15.0 | 36.0 | 160 | 150 | 667 | .50 | 11.10 |
| 2 | FZ99 | .049 | 16.3 | 59 | 959 | 3.58 | 5.22 | 7.8 | 31.4 | 27.9 | 164 | 117 | 685 | 1.99 | 11.60 |
| 3 | FZ99 | .095 | 19.1 | 60 | 1,146 | 4.32 | 7.23 | 11.0 | 27.0 | 47.5 | 195 | 199 | 817 | 3.32 | 13.60 |
| 4 | FZ99 | .103 | 19.7 | 60 | 1,182 | 4.32 | 10.33 | 10.5 | 20.3 | 44.8 | 208 | 192 | 830 | 3.20 | 13.83 |
| 5 | FZ99 | .253 | 28.5 | 59 | 1,682 | 3.95 | 10.22 | 25.0 | 24.0 | 98.8 | 245 | 413 | 1,025 | 6.98 | 17.35 |
| 6 | 5Y679 | .030 | 15.5 | 62 | 961 | 4.33 | 5.24 | 9.0 | 38.5 | 39.0 | 202 | 163 | 845 | 2.63 | 13.62 |
| 7 | 5Y679 | .047 | 16.5 | 59 | 974 | 3.90 | 5.70 | 7.5 | 34.0 | 29.3 | 194 | 123 | 812 | 2.08 | 13.75 |
| 8 | 5Y309 | .049 | 16.8 | 59 | 988 | 3.82 | 5.38 | 9.0 | 38.2 | 34.4 | 206 | 144 | 862 | 2.44 | 14.60 |
| 9 | 5Y679 | .075 | 18.3 | 60 | 1,098 | 3.68 | 6.85 | 13.5 | 29.5 | 49.6 | 202 | 208 | 845 | 3.47 | 14.10 |
| 10 | 5Y679 | .093 | 19.5 | 60 | 1,170 | 4.26 | 6.70 | 13.0 | 35.0 | 55.3 | 232 | 232 | 979 | 3.87 | 16.32 |
| 11 | 5Y679 | .024 | 15.3 | 60 | 918 | 4.34 | 9.77 | 9.5 | 16.5 | 41.3 | 162 | 171 | 675 | 2.85 | 11.50 |
| 12 | 5Y679 | .065 | 18.0 | 60 | 1,080 | 4.35 | 10.10 | 10.5 | 18.0 | 45.6 | 183 | 182 | 765 | 3.03 | 12.75 |
| 3A | FZ99 | | 15.3 | 60 | 915 | 4.47 | 7.25 | 7.5 | 23.0 | 33.5 | 167 | 140 | 697 | 2.33 | 11.63 |
| 4A | FZ99 | | 14.2 | 60 | 858 | 4.39 | 6.95 | 6.0 | 23.0 | 26.4 | 160 | 110 | 669 | 1.83 | 11.15 |

In the extreme left-hand column of Table II, the number of each of the tests is given. In the tests identified as 3A and 4A, iodine was added to the pool in the welding of vacuum-melted Zircaloy-2; in making the other tests there were no additions. The second column from the left identifies the workpiece. The third column gives the length in inches of each of the workpieces. In the fourth and fifth column, the parameters of the arc are given and in the sixth column, the input power to the arc derived from the fourth and fifth columns is given. The seventh and eighth columns give the flow of the water with its rise in temperature measured by the heat developed at the electrode and workpiece, respectively. In tests 11 and 12 with inert-gas-melted alloy the rate of water flow was higher than for the other inert-gas-melted alloys. This exerted a cooling effect on the electrode and workpiece and affected the operation of the arc. The ninth and tenth columns give the corresponding heats given up measured in calories, the eleventh and twelfth in watts and the thirteenth and fourteenth in watts per ampere.

Figure 3:
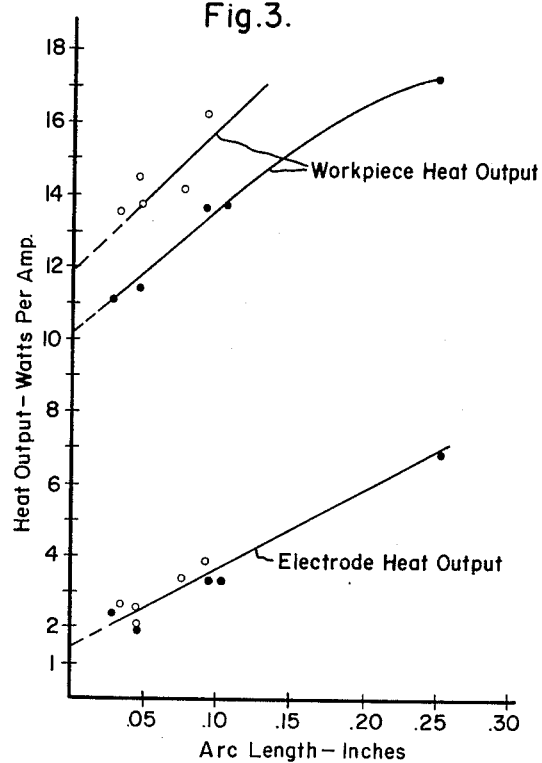
FIG. 3 is a graph showing the heat output at the workpiece and the electrode as a function of the arc length in arc welding the alloys of the two types.

In FIG. 3 the data of Table II is presented graphically. In this case, the heat output in watts per ampere is plotted vertically and the arc length horizontally. It is seen that the heat output at the anode for the inert-gas-melted alloy is substantially higher than for the vacuum-melted alloy.

Figure 4:
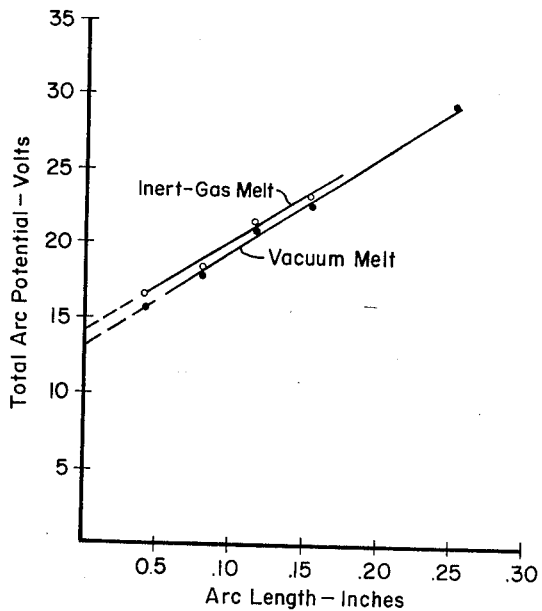
FIG. 4 is a graph showing the total arc potential as a function of arc length in the arc welding of the two alloys.

FIG. 4 presents the relationship between the total arc potential and the arc length for the two alloys. It is seen that the arc potential for the inert-gas-melted alloy is appreciably higher than for the vacuum-melted alloy.

Figure 5:
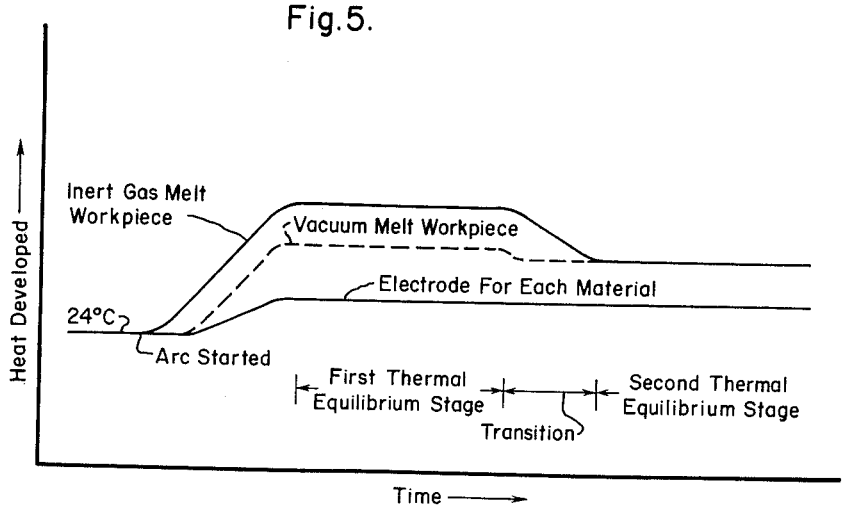
FIG. 5 is a graph showing how the heat developed at the workpiece in arc welding of the two alloys varies as a function of time.

In FIG. 5, the heats developed at the workpiece and the electrode are plotted as a function of time; heat developed is plotted vertically and timed horizontally. It is seen that while at the electrodes, the heat developed rises to and remains at a predetermined equilibrium magnitude, the heat developed at the workpieces rises to a predetermined magnitude, remains there for a certain interval and then drops to a lower magnitude. The drop for the inert-gas-melted alloy is substantially greater than the drop for the vacuum-melted alloy. The final equilibrium magnitude is the same for both alloys. This indicates that in the welding of the inert-gas-melted alloy, a vapor or gas is diffused during the early part of the welding operation, increasing the heat developed. Once this gas or vapor is driven off, it is no longer present and during the later operation, the heat developed is reduced because the diffusion no longer takes place.

The data presented here has led to the concept that the increased penetration is produced by increased energy consumed at the workpiece in the case of the inert-gas alloy, and that this increased energy arises from the diffusion of a gas occluded in the inert-gas-melted alloy. It has been concluded that this gas is the chlorine which is present in the inert-gas-melted alloy.

In accordance with this invention, adequate chlorine is provided on a workpiece of vacuum-melted alloy to achieve the desired penetration. In accordance with the preferred practice of this invention, the chlorine is added by adding zirconium sponge derived by the Kroll process to the workpiece. The amount of sponge to be added may, in each case, be determined from a knowledge of the chlorine content of the vacuum-melted workpiece and of the sponge, from the rate at which the melting operation is to take place and from the requirements of the workpiece to be welded. Thus, let:

$A$ = the quantity of chlorine contained in a vacuum-melted alloy workpiece
$B$ = the quantity of chlorine contained in a powdered zirconium sponge
$C$ = the weight of vacuum-melted alloy which is to be melted per linear inch during the welding operation
$D$ = the quantity of chlorine required in the vacuum-melted workpiece
$X$ = the amount of powdered zirconium required Then—

$$CA + BX = D(C + X) \text{ or } X = \frac{C(D-A)}{B-C}$$

Assume now that:

$A$ = 5 parts per million (see Table I)
$B$ = 100 parts per million
$C$ = 3 grams per linear inch of weld
$D$ = 30 parts per million $$X = \frac{3(30-5)}{100-30} \text{ or } 1.07 \text{ grams per linear inch of weld}$$

As has been explained, the necessary quantity of inert-gas-melted material may be deposited in the form of a powder or may be included in the workpiece in any other form.

Figure 6:
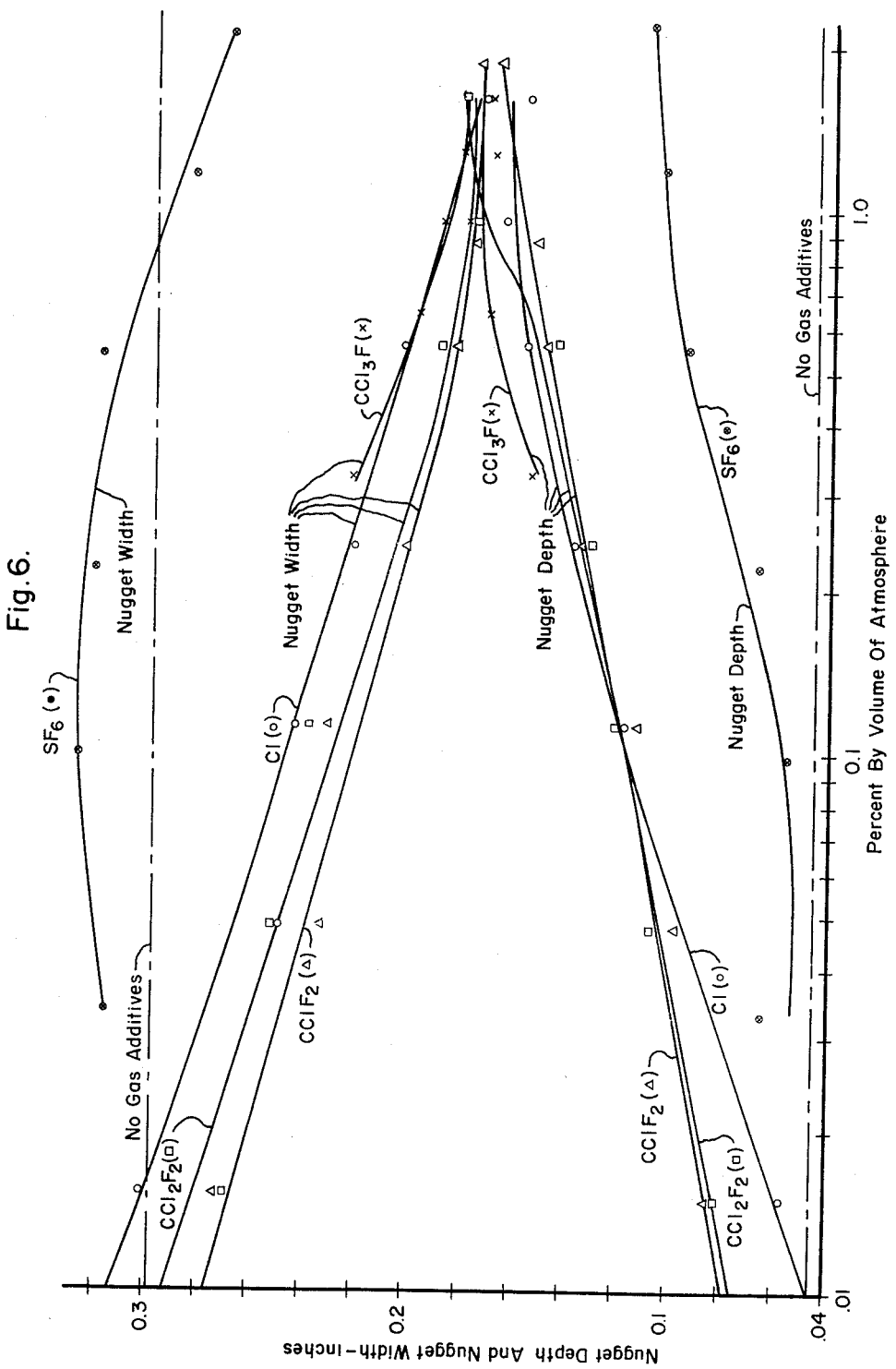
FIG. 6 is a graph showing how penetration is improved by the addition of small quantities of chlorine, certain Freons, and sulphur hexafluoride to the welding atmosphere.

FIG. 6 shows the increased penetration achieved by adding different gases. This graph is based on data adduced by Bernard W. Schaaf, E. A. Wright and Joseph H. Hart of Westinghouse Electric Corporation. In arriving at this data, Schaaf, Wright and Hart made a large number of welds in inert gas atmospheres with different small percentages of chlorine, the Freons, and sulphur hexafluoride joining plates of vacuum-melted Zircaloy-3 alloy about 2″ x 6″ x 3/16″. The plates were joined along their 2″ x 6″ surfaces and in each case the weld-nugget width and the weld-nugget depth were measured. The smaller the width and the greater the depth the deeper the penetration.

Each weld in the Schaaf, Wright and Hart work was made in a chamber generally as disclosed in application Serial No. 500,354, filed April 11, 1955, to Lloyd B. Kramer, Alvin H. Kasberg, and John G. Landkrohn and assigned to Westinghouse Electric Corporation, and now Patent No. 3,018,357. The chamber was in each case filled with argon as a shielding gas and a measured quantity by volume of the reactive gas added. The welding was in each case carried out at an ar potential of 10 volts with a current of 150 amperes. The rate of welding was about 10 inches per minute.

FIG. 6 shows the results graphically. Puddle depth and puddle width in inches are plotted vertically and percent of added gas by volume horizontally. The horozontal dash-dot lines represent the depth and widths when welding in pure argon; the other curves are labeled. It is seen that small quantities of each of the gases added produce improved penetration.

The welding in the practice of this invention should preferably be carried out in the manner disclosed in the above-identified Kramer-Kasberg-Landkrohn application.

While preferred embodiments have been disclosed herein, many modifications thereof are feasible. The invention therefore is not to be restricted except insofar as is necessitated by the spirit of the prior art.

I claim as my invention:

1. The method of increasing the penetration in the work in the arc welding of vacuum-melted zirconium-base alloy which comprises adding an effective quantity of zirconium sponge to the welding pool during the welding operation.

2. The method of increasing the penetration in the work in the arc welding of work consisting predominantly or wholly of zirconium which comprises adding an effective quantity of a halide containing material to the welding pool during the welding operation.

3. In the method of arc welding a vacuum-melted zirconium-base alloy workpiece with a non-consumable electrode in the practice of which an arc is produced between said electrode and said workpiece, the novelty of producing adequate penetration of said weld in said workpiece by adding a small but effective amount of chlorine to said arc as said welding proceeds.

4. In the method of arc welding a vacuum-melted zirconium-base alloy workpiece with a non-consumable electrode in the practice of which an arc at straight polarity is produced between said electrode and said workpiece, the novelty of producing adequate penetration of said weld in said workpiece by adding an effective amount of powdered zirconium sponge to said arc as said welding proceeds to increase the chlorine content of the arc pool in said workpiece to of the order of 30 parts per million.

5. In the method of arc welding a vacuum-melted zirconium-base alloy workpiece with a non-consumable electrode in the practice of which an arc at straight polarity is produced between said electrode and said workpiece, the novelty of producing adequate penetration of said weld in said workpiece by adding an effective amount of zirconium sponge to said arc as said welding proceeds.

6. In the method of arc welding a workpiece consisting predominantly or wholly of zirconium with a welding electrode in the practice of which an arc is produced between said electrode and said workpiece, the novelty of producing adequate penetration of said weld in said workpiece by adding an effective quantity of halide containing material to said arc.

7. In the method of arc welding a workpiece consisting predominantly or wholly of zirconium which comprises producing an arc between said electrode and said workpiece, said arc being shielded by inert gas, the novelty of producing adequate penetration of said weld in said workpiece by adding a small but effective amount of at least one compound of the class consisting of trichloromonofluoromethane, dichlorodifluoromethane, monochlorodifluoromethane, chlorine and sulfur hexafluoride to said inert gas.

References Cited in the file of this patent

UNITED STATES PATENTS

| | | |
|---|---|---|
| 123,296 | Schurr et al. | Jan. 30, 1872 |
| 553,296 | Aylsworth | Jan. 21, 1896 |
| 1,794,810 | Van Arkel et al. | Mar. 3, 1931 |
| 2,548,897 | Kroll | Apr. 17, 1951 |
| 2,576,793 | Jordan | Nov. 27, 1951 |
| 2,698,892 | Hardin | Jan. 4, 1955 |
| 2,536,673 | Widell | Jan. 2, 1957 |
| 2,852,659 | Belz | Sept. 16, 1958 |